United States Patent [19]

Vinches et al.

[11] Patent Number: 4,602,079

[45] Date of Patent: Jul. 22, 1986

[54] URETHANE ELASTOMERS PREPARED USING A PREPOLYMER PREPARED FROM A POLYESTER WHICH REACTS WITH A CHAIN-EXTENDING AGENT AND/OR A SATURATED POLYESTER RESIN IN WHICH AT LEAST ONE OF THE POLYESTERS IS PREPARED FROM A DIMER AND/OR TRIMER FATTY ACID

[75] Inventors: Gérard Vinches, Louviers; Line L. Fiquet, Rouen, both of France

[73] Assignee: Witco Chemical Corporation, New York, N.Y.

[21] Appl. No.: 704,030

[22] Filed: Feb. 21, 1985

[30] Foreign Application Priority Data

Feb. 23, 1984 [FR] France .............................. 84 02741

[51] Int. Cl.⁴ .............................................. C08G 18/10
[52] U.S. Cl. ........................................ 528/60; 528/65; 528/66; 528/74.5
[58] Field of Search ...................... 528/60, 65, 66, 74.5

[56] References Cited

U.S. PATENT DOCUMENTS

| | | | |
|---|---|---|---|
| 3,068,254 | 12/1962 | LeBras et al. | 521/159 |
| 3,106,537 | 10/1963 | Simon et al. | 528/80 |
| 3,264,236 | 8/1966 | Santaniello | 528/80 |
| 3,349,049 | 10/1967 | Seiwert et al. | 524/906 |
| 3,383,343 | 5/1968 | Mohajer et al. | 528/275 |
| 3,406,134 | 10/1968 | Seiwert et al. | 528/75 |
| 3,498,940 | 3/1970 | Laganis | 524/539 |
| 4,195,000 | 3/1980 | Charles et al. | 524/605 |

FOREIGN PATENT DOCUMENTS 928447  6/1973  Canada .
987827  4/1974  Canada .

Primary Examiner—Maurice J. Welsh
Attorney, Agent, or Firm—Cushman, Darby & Cushman

[57] ABSTRACT

The hydrolysis resistance of a urethane elastomer prepared by reacting a hydroxy compound with a prepolymer in a weight ratio of between 5/95 and 95/5 is improved; the hydroxy compound consists of at least one saturated polyester resin and/or at least one chain-extending agent, if necessary in the presence of the usual additives, each resin and each chain-extending agent having at least two OH end groups; the prepolymer is prepared by reacting at least one saturated polyester resin having at least two OH end groups and at least one organic isocyanate of functionality $\geq 2$, in molar excess. To this end, to prepare at least one polyester resin, a fraction of the polyacid(s) used is replaced by at least one polymerized fatty acid, consisting substantially of a dimer and/or a trimer, the initial total content of polymerized fatty acid(s) being between 1 and 35% by weight, referred to the finished product. The value of the load at break of the elastomer is retained to an extent of at least 50% or has a value at least equal to 5 MPa after hydrolysis.

20 Claims, No Drawings

URETHANE ELASTOMERS PREPARED USING A PREPOLYMER PREPARED FROM A POLYESTER WHICH REACTS WITH A CHAIN-EXTENDING AGENT AND/OR A SATURATED POLYESTER RESIN IN WHICH AT LEAST ONE OF THE POLYESTERS IS PREPARED FROM A DIMER AND/OR TRIMER FATTY ACID

The present invention relates to a method for improving the hydrolysis resistance of urethane elastomers based on saturated polyester resins, to compositions for applying this method, and to the products obtained thereby.

These urethane elastomers are generally prepared by reacting a prepolymer, which is the reaction product of a polyester resin and an organic diisocyanate, with a hydroxy compound; this hydroxy compound consists either of at least one chain-extending agent or at least one polyester resin in the presence of a surfactant and a catalyst, or of a mixture: chain-extending agent(s)/polyester resin(s)/surfactant and catalyst. Dicarboxylic acids, such as adipic acid, are commonly used to prepare the polyester resin.

It appears that, for some applications, the urethane elastomers produced in this way have too great a sensitivity to water. This is indeed the case when these elastomers are intended for making shoe soles; it is also the case when they enter into the production of engineering parts required to have good hydrolysis resistance.

The applicants have discovered that on replacing with polymerized fatty acids part of the dicarboxylic acids normally used in the preparation of polyester resins (used both to prepare the hydroxy compound and to prepare the prepolymer), the hydrolysis resistance of the resulting urethane elastomers was considerably improved. However, this property of polymerized fatty acids was not obvious to the person skilled in the art who analyzed the prior state of the art.

In point of fact, a vulcanizable crude urethane rubber giving a vulcanized elastomer product with outstanding hydrolysis resistance is known from Canadian Pat. No. 987,827. To prepare this crude urethane rubber, a slight excess of an organic diisocyanate is reacted with a polyester diol; this polyester diol is prepared from an (azelaic acid/$C_{36}$ dimer acid) mixture and a (1,4-butanediol/polypropylene glycol) mixture; the chain is then extended with the aid of a polyol of the glycerol $\alpha$-allyl ether or trimethylolpropane monoallyl ether type. This crude rubber can then be vulcanized with sulphur, the unsaturated groups of the chain-extending polyols providing the required crosslinking during vulcanization.

It is stated in the last paragraph of page 2 of this patent that the crude urethane rubber described in the prior Canadian Pat. No. 928,447 and prepared by reacting an organic diisocyanate with a polyester prepared from azelaic acid and a 1,4-butanediol/propylene glycol mixture, already showed very good hydrolysis resistance and very good low-temperature properties, but crystallized slightly when exposed to these low temperatures for a long time.

It follows that Canadian Pat. No. 987,827 does not suggest in any way to the person skilled in the art to introduce polymerized fatty acids into urethane elastomers of the same type as those which form the subject of the present patent application which, in their case, are not intended to be vulcanized, given that a comparison between the two crude urethane rubbers specified in the abovementioned Canadian patents suggests that the introduction of the dimer acid enables only the low-temperature crystallization problem to be solved.

Polyester resins which are elastic and hydrolysis-resistant, are also known from Polish Pat. No. 98,184. Dimer acids are used in the preparation of these resins and it is stated in this Polish patent that, in combination with polypropylene glycol or polybutylene glycol of a molecular weight between 900 and 3500, these dimer acids confer elasticity. It could therefore not be deduced from this patent that the utilization of polymerized fatty acids in specific quantities in the preparation of polyester resins, themselves used in the preparation of urethane elastomers, would lead to a very appreciable improvement in the hydrolysis resistance of these elastomers.

The same conclusion can be drawn from many documents in the literature:

German Pat. No. 2,904,184 states that polyesters in the preparation of which from 1 to 30% of dimer fatty acids are used to give moulding compositions which have a higher impact strength;

U.S. Pat. No. 4,155,899 mentions an increase in the flexibility of a polyester due to the introduction of dimer acids;

U.S. Pat. No. 3,068,254 describes flexible polyurethane foams prepared by reacting a compound containing at least two isocyanate groups and a polyester obtained from polyacids which consist solely of dimer and trimer acids and from diols containing a plurality of ether groups, the choice of these diols enabling the viscosity of the polyester to be reduced, this high viscosity being due to the presence of polymeric polyacids;

U.S. Pat. No. 3,264,236 describes a liquid polymer which consists of a polyester whose hydroxy end groups have been replaced by isocyanate groups and which is prepared from diethylene glycol and exclusively from dimer and trimer fatty acids, as polyacids. This liquid polymer is intended to be mixed with an inorganic oxidant and a hardener to give a solid propellant. Here, the purpose of the dimer and trimer fatty acids is, on the one hand, to prevent the liquid polymers prepared in this way from having a tendency to absorb water from the atmosphere, the absorbed water reacting with the isocyanate groups thereby reducing the number of these available for the hardening reaction and, on the other hand, to reduce the viscosity of the mixture as well as the temperature at which the hardening is to take place;

U.S. Pat. No. 3,383,343 describes a polyester intended to be spun and obtained by reacting at least one polymethylene glycol with at least one aromatic dicarboxylic acid and at least one dimer fatty acid which represents 55 to 65% by weight of the total weight of acids. The possible role of these dimer fatty acids is not mentioned in any way;

U.S. Pat. No. 3,106,537 describes cellular plastics consisting of reaction products of alkyd resins and polyisocyanates exhibiting better physical properties at high temperatures. Dimer acids can enter into the formulation of resins; however, the possible role of these dimers in the final product is not disclosed anywhere in this patent;

U.S. Pat. No. 3,349,049 describes a polyurethane coating which is obtained by mixing an organic solution of a polyfunctional compound containing several free isocyanate groups and an organic solution of a polyester with hydroxy end groups whose constituent polyacids include from 10 to 80 mole % of dimer acids, which are used in particular to improve the chemical resistance, impact strength and flexibility of these films;

U.S. Pat. No. 3,498,940 relates to polyester urethanes intended to be mixed with phenolic or other resins and react with these resins to give varnishes which are stable at high temperature. The dimer fatty acids used for the preparation of the polyesters are only assumed to improve the flexibility of the polyester;

U.S. Pat. No. 3,406,134 describes urethane coating compositions which can be hardened in the presence of moisture, the resultant coatings having good chemical resistance and good abrasion resistance. The dimers which form a part of the polyacids are used here to improve the abrasion resistance of these films.

To sum up, none of the abovementioned prior documents suggests that the presence of polymerized fatty acids, in specified proportions, is the cause of a remarkable improvement in the hydrolysis resistance of saturated urethane elastomers which are the subject of the present invention.

In the first place, the purpose of the present invention is to provide a method for improving the hydrolysis resistance of a saturated urethane elastomer, the said elastomer being prepared by reacting a hydroxy compound with a prepolymer, the weight ratio hydroxy compound/prepolymer being between 5/95 and 95/5, the said hydroxy compound consisting:

either of at least one chain-extending agent;
 or of at least one saturated polyester resin in the presence of the usual additives;
 or of a mixture of at least one chain-extending agent and at least one saturated polyester resin in the presence of the usual additives, each chain-extending agent and each polyester resin containing at least two hydroxy end groups, the said prepolymer being prepared by reacting at least one saturated polyester resin containing at least two hydroxy end groups and at least one organic isocyanate of functionality of at least 2, the isocyanate(s) being in molar excess relative to the polyester resin(s), each of the polyester resins being prepared by reacting at least one polyacid with at least one polyol, in which method, to prepare at least one of the polyester resins, a fraction of the polyacid(s) is replaced by at least one polymerized fatty acid consisting essentially of a dimer and/or a trimer, the initial total content of polymerized fatty acid(s) being between 1 and 35% by weight and, in particular, between 4 and 25% by weight, these percentages being referred to the finished product.

Polymerized fatty acids, responsible for improving the hydrolysis resistance of urethane elastomers thus defined, can therefore be used in the preparation of a polyester or polyesters forming part of the formulation either of the hydroxy compound or of the prepolymer. They can also be used to prepare at least one polyester forming part of the formulation of the hydroxy compound and, in parallel, to prepare at least one polyester forming part of the formulation of the prepolymer.

The polyols and the polyacids used for the preparation of polyester resins are saturated polyols and polyacids. The introduction, according to the present invention, of polymerized fatty acids obtained from unsaturated polyacids introduces a residual unsaturation content; the result of this is that urethane elastomers modified according to the invention could be described as "substantially saturated".

It was found that beyond a content of 35% by weight of polymerized fatty acid(s), this percentage being referred to the finished product, the polyester resins forming part of the composition both of the prepolymer and the hydroxy compound, became very viscous, which resulted in practical handling difficulties. Similarly, below a content of 1% by weight of polymerized fatty acid(s), this percentage being referred to the finished product, the hydrolysis resistance of the urethane elastomers obtained is of little significance.

It has moreover been found that trimers play an important part in the improvement of the hydrolysis resistance of the urethane elastomers now defined; thus the applicants noticed that, when they used a polymerized fatty acid of the conventional type including both dimers and trimers, the hydrolysis resistance of a given urethane elastomer increased, as a rule, as the proportion of trimers was increased. However, while, in some cases, the person skilled in the art may be able to envisage introducing trimers on their own, in most cases the trimers, which give rise to a higher degree of crosslinking than the dimers and which consequently can increase the viscosity of the resultant polyesters, are introduced together with the dimers, the preferred trimer content being of the order of 4 to 25% by weight. A polymerized fatty acid containing about 80% by weight of dimer and about 20% by weight of trimer will be used in particular.

Polymerized fatty acids are chosen in particular from the group consisting of the dimers and trimers of unsaturated aliphatic monoacids containing from 8 to 24 carbon atoms and mixtures of these with one another. For example, the dimers and trimers of mixtures of oleic, linoleic and linolenic acids can be mentioned and, in particular, the dimerized and trimerized oleic acid fatty acids.

In practice, the polymerized fatty acids are introduced in the form of dimer and trimer fatty acids which are obtained by fractionating polymerized fatty acids or mixtures of polymerized fatty acids and which contain less than about 1.5% by weight of monomers. As a rule, these polymerized fatty acids are mixtures of monomers, dimers and trimers, the monomers introduced in this way not playing any part in the improvement of the hydrolysis resistance of the resulting urethane elastomers.

Use is made in particular of polymerized fatty acids which are in the form of a polymeric composition derived from a mixture of unsaturated fatty acids containing, on average 18 carbon atoms and including:

from 0 to 1.5% by weight of monomers;
 from 80 to 96% by weight of dimers; and
 from 4 to 20% by weight of trimers, these ranges of products corresponding to the polymerized fatty acids generally marketed under the name of "dimer acids".

In accordance with another feature of the method according to the present invention, a hydroxy compound/prepolymer weight ratio of the order of 60/40 is preferably chosen.

According to other features of the method according to the present invention, saturated polyester resins whose acid number is less than 2 and whose hydroxyl value is between about 25 and 230 are used; and a prepolymer is used whose isocyanate group content is between 2 and 25% by weight.

The method according to the invention for obtaining substantially saturated hydrolysis-resistant urethane elastomers can be described in greater detail as follows:

The polyester resins are prepared in the following way:

For each preparation, the condensation reaction is carried out between at least one dicarboxylic acid (or a monomeric dicarboxylic acid anhydride), if necessary in combination with a polymerized fatty acid, and at least one polyol, in the required proportions, at a temperature of the order of 200°–250° C., using a conventional esterification catalyst; the esterification reaction is continued until at least two hydroxy groups per polyester molecule and an acid number of less than 2 are obtained. Preferably, the reaction is continued until two hydroxy groups per polyester molecule and an acid number between 0.8 and 2 are obtained.

Among the dicarboxylic acids which may be used, succinic acid, glutaric acid, adipic acid and their mixtures may be cited. Mention can be made, in particular, of adipic acid and a mixture by weight of "dicarboxylic acids" containing 22 to 32% of adipic acid, 40 to 45% of glutaric acid and 28 to 33% of succinic acid. Among the carboxylic acid anhydrides, phthalic anhydride, isophthalic anhydride and terephthalic anhydride may be mentioned.

Among the polyols which can be used with advantage may be cited, by way of examples, diols such as ethylene glycol, polyethylene glycols such as diethylene glycol, propylene glycol, polypropylene glycols such as dipropylene glycol, 1,4-butanediol, 1,6-hexanediol, neopentyl glycol, triols such as glycerol and trimethylolpropane, and polyols such as pentaerythritol.

The catalysts which may be used can advantageously be taken from the group consisting of organic titanates, alkylaryl- and alkylsulphonic acids, phosphoric acids, tin salts, and the like. The catalysts can advantgeously be present in the reaction mixture at a concentration of between 0.004% and 0.020% by weight relative to the weight of the reaction mixture.

The preferred hydroxy compound is a mixture of one (or more) polyester resin(s) prepared as has just been indicated with a "catalytic mixture" consisting of at least one chain-extending agent, at least one surfactant and at least one catalyst. A hydroxy compound consisting solely of one (or more) chain-extending agent(s) can also be used with advantage.

The chain-extending agents are advantageously chosen from the group consisting of low molecular weight polyols, for example monoethylene glycol, 1,4-butanediol, trimethylolpropane or glycerol, aromatic amines such as methylene-bis(2-chloroaniline), methylenebis(dipropylaniline), diethyl-toluenediamine, trimethylene glycol di-p-aminobenzoate and aliphatic polyamines such as isophorone diamine.

The surfactants which are used are advantageously of the inorganic oil type which are mixtures of naphthenic and paraffinic structure hydrocarbons, or of the silicone oil type.

As regards catalysts, these are advantageously amino type catalysts, for example 1,4-diazabicyclo[2.2.2.]octane.

To prepare the prepolymer, at least one polyester resin of the abovementioned type, in the preparation of which, if appropriate, a polymerized fatty acid is used, is reacted with at least one isocyanate which has a functionality equal to at least 2 and which is in particular an aliphatic isocyanate such as hexamethylene 1,6-diisocyanate or an aromatic isocyanate such as 4,4'-diphenylmethane diisocyante or toluene diisocyanate.

As indicated above, the isocyanate part is in molar excess relative to the polyester resin (or polyester resins) so as to obtain a prepolymer with isocyanate ends which can react with the hydroxy compounds to give a polyurethane elastomer.

Another subject of the present invention is compositions for applying the abovementioned method and the elastomers obtained by this method.

To enable the subject of the present invention to be better understood, a description will now be given of several purely illustrative and non-restrictive examples of urethane elastomers according to the invention, whose mechanical properties after hydrolysis are compared with those of a reference elastomer for the preparation of which no polymerized fatty acids were used to prepare the polyester resin used.

General operating procedure for the preparation of urethane elastomers (A) Preparation of a polyester resin A reactor is charged with the mixture of diacid(s) and polyol(s) used. The mixture is heated and stirred under an inert gas atmosphere which can be nitrogen or a gas containing 11 to 13% by weight of carbon dioxide, 2 to 3% by weight of carbon monoxide and less than 10 ppm of oxygen. The catalyst used is introduced. The water formed during the reaction distils off at about 150° C. for 1 to 4 hours and the temperature rises gradually. The temperature is maintained at a value between 200° and 250° C. until an acid number of less than 2 and a hydroxyl value (number of OH groups) of between 25 and 230 are obtained. The total reaction time is 15 to 30 hours.

It is of course understood that several polyester resins can be used together to prepare a given urethane elastomer.

(B) Preparation of the hydroxy compound (in the case there this consists of a mixture: polyester resin(s)/chain-extending agent(s)/usual additives).

Into a mixer is introduced the polyester resin or mixture of polyester resins whose preparation was described in paragraph A and the catalytic mixture consisting of the chain-extending agent(s), surfactant(s) and catalyst(s) is added to it. The surfactant(s) is (or are) sometimes mixed beforehand with the polyester resin in question for solubility reasons. The water content of the hydroxy compound is determined and adjusted, according to the case, to between 0.05 and 0.50% by weight.

(C) Preparation of the prepolymer

The diisocyanate(s) used is (or are) heated in a reactor at a temperature between 40° and 80° C., and then the polyester resin(s) prepared as indicated in paragraph A is (or are) added with stirring. The temperature rises to between 80° and 110° C. and this temperature is maintained for a period of between 1 and 6 hours. The NCO group content is determined and adjusted to a value of between 2 and 25% by weight.

(D) Continuous preparation of urethane elastomer

The prepolymer prepared as indicated in paragraph C and the hydroxy compound prepared as indicated in paragraph B are each introduced into a tank of the machine and heated to a temperature of between 20° and 60° C. The flow-rates, on the one hand of the prepolymer and, on the other, of the hydroxy compound which are the intended reactants, are adjusted so as to obtain the required hydroxy compound/prepolymer weight ratio in the mixing head of the machine. This ratio can be between 5/95 and 95/5; it is generally 60/40. The mixture is cast or injected at a temperature between 20° and 60° C. into a mould which is immediately closed.

(E) Measurement of mechanical properties

A hydrolysis test according to Standard DIN 53344 is performed on a sample of each urethane elastomer batch obtained; in this test the sample concerned is placed in a chamber at 70° C. and 100% relative humidity (saturated water vapour) for 7 days.

The mechanical properties are measured for each batch on a sample taken before hydrolysis and on a sample obtained after hydrolysis carried out as indicated above. The mechanical properties examined are in particular:

- abrasion resistance according to Standard DIN 53516;
- elongation and load at break according to Standard ASTM T 412 die C (or NF T 46002);
- tensile strength according to Standard ASTM T 412 die C (or NF T 46002);
- tear strength according to Standard ASTM T 1004 (or NF T 46007);
- bending strength according to the ROSS FLEX method.

In particular, it is the results given by the load at break tests which are considered to be the most significant in the measurement of mechanical properties; thus for a urethane elastomer to be considered effective, i.e. to have a suitable hydrolysis resistance in the sense of the present invention, 50% of its break load must be retained after hydrolysis or it must have a value of at least 5 MPa. In all the following examples, only the values obtained for elongation and load at break have been recorded; nevertheless, the other properties were on the whole retained for the elastomers in accordance with the present invention in acceptable proportions.

To illustrate the improvement in hydrolysis resistance which the method according to the present invention provides, a reference urethane elastomer was made, which is the subject of the comparative example hereinafter and whose basic polyester resins were made without the use of polymerized fatty acids, and several urethane elastomers were also prepared in accordance with the present invention, which are the subject of Examples 1 to 10 hereinafter and whose basic polyester resins were made with incorporation of polymerized fatty acids.

In these examples, all the percentages given for the ingredients are by weight; in addition, the percentages, also given by weight, of the polymerized fatty acids in the urethane elastomers are percentages referred to the finished products.

COMPARATIVE EXAMPLES

A-1-Preparation of polyester resin No. 1

The following ingredients were used for this preparation:

| | |
|---|---|
| adipic acid | 60.23% |
| monoethylene glycol | 18.47% |
| diethylene glycol | 21.28% |
| catalyst | 0.02% |

The acid number must be <2 and the hydroxyl value must be between 50 and 60.

2-Preparation of polyester resin No. 2

The following ingredients were used:

| | |
|---|---|
| adipic acid | 54.82% |
| diethylene glycol | 42.62% |
| trimethylolpropane | 2.54% |
| catalyst | 0.02% |

The acid number must be <2 and the hydroxyl value must be between 50 and 60.

3-Preparation of polyester resin No. 3

The following ingredients were used:

| | |
|---|---|
| adipic acid | 62.46% |
| monoethylene glycol | 21.85% |
| diethylene glycol | 4.13% |
| 1,4-butanediol | 11.52% |
| catalyst | 0.02% |

The acid number must be <2 and the hydroxyl value must be between 50 and 60.

B-Preparation of the hydroxy compound

The following ingredients were used:

| | |
|---|---|
| polyester resin No. 1 | 79.60% |
| polyester resin No. 2 | 15.00% |
| monoethylene glycol | 4.40% |
| 1,4-diazabicyclo[2.2.2.]octane | 0.70% |
| surfactant consisting of a silicone oil sold under the name of "DOW CORNING DC 193" by "THE DOW CHEMICAL Co." | 0.30% |

C-Preparation of the prepolymer

The following ingredients are used:

| | |
|---|---|
| 4,4'-diphenylmethane diisocyanate | 54.30% |
| polyester resin No. 3 | 45.70% |

The NCO group content must be equal to 16.25%±0.15% by weight.

D-Preparation of the urethane elastomer

The procedure followed is as described in paragraph D of the general operating procedure, the hydroxy compound/prepolymer ratio being 61.7/38.3.

E-Measurement of mechanical properties before and after hydrolysis

The results obtained are given in the following table:

|                      | Before hydrolysis | After hydrolysis |
|----------------------|-------------------|------------------|
| Elongation at break (%) | 600            | 450              |
| Load at break (MPa)  | 11.0              | 2.3              |

It is seen that the mechanical property of load at break is retained only to an extent of 20.9% after hydrolysis, which means that there is a chemical deterioration of the elastomer, thereby revealing the very low resistance of this reference urethane elastomer.

EXAMPLE 1

An elastomer containing 5.6% of polymerized fatty acids was prepared.

| adipic acid | 56.05% |
|---|---|
| "dimer acids" sold under the name of "PRIPOL 1014" by the company "UNICHEMA" and consisting of 1% monomers, 95% dimers and 4% trimers | 10.20% |
| monoethylene glycol | 13.65% |
| 1,4-butanediol | 20.08% |
| catalyst | 0.02% |

The acid number must be <2 and the hydroxyl value must be between 50 and 60. The polymerized fatty acids content of this polyester resin was 11.80% by weight.

2-Preparation of polyester resin No. 5

The following ingredients are used:

| adipic acid | 61.79% |
|---|---|
| monoethylene glycol | 15.51% |
| 1,4-butanediol | 22.70% |
| catalyst | 0.02% |

The acid number must be <2 and the hydroxyl value must be between 50 and 60.

B-Preparation of the hydroxy compound

The following ingredients are used for this preparation:

| polyester resin No. 4 | 75.96% |
|---|---|
| polyester resin No. 2, as defined in the comparative example | 15.00% |
| 1,4-butanediol | 8.10% |
| surfactant consisting of a mineral oil sold under the name of "PLASTIC OIL 263" by the "WITCO CHEMICAL" company | 0.40% |
| 1,4-diazabicyclo[2.2.2]octane | 0.50% |
| water | 0.04% |

C-Preparation of the prepolymer

The following ingredients are used:
4,4'-diphenylmethane diisocyanate with an NCO group content of 33.6±0.2% 51.50%
4,4'-diphenylmethane diisocyanate modified by carbodiimides, with an NCO group content of 30±1% by weight 10.80%

| polyester resin No. 5 | 37.70% |
|---|---|

The NCO group content of the prepolymer obtained must be 19.2±0.15% by weight.

D-Preparation of the urethane elastomer

The procedure followed is that indicated in paragraph D of the general operating procedure using a hydroxy compound/prepolymer ratio of 62.1/37.9 by weight.

E-Measurement of the mechanical properties before and after hydrolysis

|                      | Before hydrolysis | After hydrolysis |
|----------------------|-------------------|------------------|
| Elongation at break (%) | 500            | 650              |
| Load at break (MPa)  | 11.1              | 7.5              |

It is seen that after hydrolysis the load at break is retained to an extent of 67.6%, which is considered as being amply satisfactory to indicate that the urethane elastomer obtained in this way has a very reasonable hydrolysis resistance.

EXAMPLE 2

A urethane elastomer containing 5.2% of polymerized fatty acids is prepared.

A-Preparation of the polyester resins

Polyester resin No. 4 whose constituents are indicated in Example 1 is used, as well as polyester resin No. 2 whose constituents are given in the comparative example.

B-Preparation of the hydroxy compound

The following ingredients are used:

| polyester resin No. 4 | 74.47% |
|---|---|
| polyester resin No. 2 | 14.71% |
| 1,4-butanediol | 9.90% |
| surfactant consisting of a mineral oil sold under the name of "PLASTIC OIL 263" by the "WITCO CHEMICAL" Company | 0.39% |
| 1,4-diazabicyclo[2.2.2]octane | 0.49% |
| water | 0.04% |

C-Preparation of the prepolymer

The same prepolymer as that prepared for Example 1 is used.

D-Preparation of the urethane elastomer

The procedure indicated in paragraph D of the general operating procedure is followed, the hydroxy compound/prepolymer ratio being 58.8/41.2 by weight.

E-Mechanical properties before and after hydrolysis

|                      | Before hydrolysis | After hydrolysis |
|----------------------|-------------------|------------------|
| Elongation at break (%) | 450            | 625              |
| Load at break (MPa)  | 16.4              | 9.7              |

It is seen that the load at break is retained to an extent of 59.1% after hydrolysis, and consequently the urethane elastomer thus prepared can be considered satisfactory from the point of view of retention of its hydrolysis resistance.

EXAMPLE 3

A urethane elastomer is prepared containing 22.0% of polymerized fatty acids.

A-Preparation of polyester resins

Polyester resin No. 2 as defined in the comparative example is used as well as polyester resin No. 6 defined hereafter:

| | |
|---|---|
| adipic acid | 32.75% |
| "dimer acids" sold under the name of "PRIPOL 1022" by the company "UNICHEMA" and consisting of 80% dimers and 20% trimers | 40.00% |
| monoethylene glycol | 12.75% |
| diethylene glycol | 14.48% |
| catalyst | 0.02% |

The acid number must be <2 and the hydroxyl value between 50 and 60. The polymerized fatty acids content of this polyester resin is 44.71% by weight.

B-Preparation of the hydroxy compound

The following ingredients are used:

| | |
|---|---|
| polyester resin No. 6 | 79.60% |
| polyester resin No. 2 | 15.00% |
| surfactant consisting of a mineral oil sold under the name of "PLASTIC OIL 263" by the "WITCO CHEMICAL" company | 0.30% |
| monoethylene glycol | 4.40% |
| 1,4-diazabicyclo[2.2.2.]octane | 0.70% |

C-Preparation of the prepolymer

The following ingredients are used:

| | |
|---|---|
| 4,4'-diphenylmethane diisocyanate | 54.30% |
| polyester resin No. 3 | 45.70% |

The NCO group content must be 16.25±0.15% by weight.

D-Preparation of the urethane elastomer

The procedure indicated in paragraph D of the general operating procedure is followed with a hydroxy compound/prepolymer ratio of 61.7/38.3 by weight.

E-Measurement of mechanical properties before and after hydrolysis

The following results were obtained:

| | Before hydrolysis | After hydrolysis |
|---|---|---|
| Elongation at break (%) | 425 | 500 |
| Load at break (MPa) | 10.0 | 6.4 |

It is seen that the load at break is retained to an extent of 64% after hydrolysis, which is considered to be satisfactory.

EXAMPLE 4

A urethane elastomer containing 21.7% of polymerized fatty acids is prepared.

A-Preparation of the polyester resin

A polyester resin No. 7 is prepared based on the same ingredients as polyester resin No. 6, but the "dimer acids" of which consist of a product sold under the name of "HYSTRENE-3680" by the company "HUMKO" and are composed of 1.5% monomers, 83% dimers and 15.5% trimers, resulting in the polymerized fatty acids content of this polyester resin No. 7 being 44.1% by weight.

B-Preparation of the hydroxy compound

The following ingredients are used:

| | |
|---|---|
| polyester resin No. 7 | 79.60% |
| polyester resin No. 2 | 15.00% |
| monoethylene glycol | 4.40% |
| surfactant consisting of a mineral oil sold under the name of "PLASTIC OIL 263" by the "WITCO CHEMICAL" company | 0.30% |
| 1,4-diazabicyclo[2.2.2]octane | 0.70% |

C-Preparation of the prepolymer

The same ingredients as those indicated in Example 3 are used.

D-Preparation of the elastomer

The procedure followed is that indicated in paragraph D of the general operating procedure with a hydroxy compound/prepolymer ratio of 61.7/38.3.

E-Measurement of mechanical properties before and after hydrolysis

The following results were obtained:

| | Before hydrolysis | After hydrolysis |
|---|---|---|
| Elongation at break (%) | 425 | 550 |
| Load at break (MPa) | 7.9 | 6.1 |

It is seen therefore that 77.2% of the load at break is retained after hydrolysis, which is a wholly satisfactory result.

EXAMPLE 5

An urethane elastomer containing 9.3% of polymerized fatty acids is prepared.

A-Preparation of polyester resins (a) Preparation of polyester resin No. 8

The following ingredients are used:

| | |
|---|---|
| adipic acid | 46.30% |
| "dimer acids" sold under the name of "PRIPOL 1022" by the company "UNICHEMA" and consisting of 80% dimers and 20% trimers | 20.00% |
| monoethylene glycol | 15.80% |
| diethylene glycol | 17.80% |
| catalyst | 0.02% |

The acid number must be <2 and the hydroxyl value between 50 and 60. The polymerized fatty acids content of this polyester resin is 22.9% by weight.

(b) Preparation of polyester resin No. 9

The following ingredients are used:

| | |
|---|---|
| adipic acid | 54.24% |
| diethylene glycol | 42.49% |
| trimethylolpropane | 3.25% |
| catalyst | 0.02% |

The acid number must be <2 and hydroxyl value between 50 and 60.

B-Preparation of the hydroxy compound

The following ingredients are used:

| | |
|---|---|
| polyester resin No. 8 | 84.20% |
| monoethylene glycol | 13.48% |
| isobutyl phthalate | 1.00% |
| surfactant consisting of a silicone oil sold under the name of "DOW CORNING DC 193" by "THE DOW CHEMICAL" company | 0.40% |
| 1,4-diazabicyclo[2.2.2.]octane | 0.45% |
| water | 0.47% |

C-Preparation of the prepolymer

The following ingredients are used:

| | |
|---|---|
| 4,4'-diphenylmethane diisocyanate with an NCO group content of 33.6 ± 0.2% by weight | 66.00% |
| 4,4'-diphenylmethane diisocyanate modified by carbodiimides and having an NCO group content of 30 ± 1% by weight | 5.00% |
| polyester resin No. 9 | 29.00% |

The NCO group content must be 22.15%±0.15% by weight.

D-Preparation of the elastomer

The procedure followed is that indicated in paragraph D of the general operating procedure with a hydroxy compound/prepolymer ratio of 48.1/51.9.

E-Measurement of mechanical properties before and after hydrolysis

The following results were obtained:

| | Before hydrolysis | After hydrolysis |
|---|---|---|
| Elongation after break (%) | 300 | 350 |
| Load at break (MPa) | 9.15 | 6.4 |

It is seen that 69.9% of the load at break is retained after hydrolysis, which is a wholly satisfactory result.

EXAMPLE 6

A urethane elastomer containing 9.8% of polymerized fatty acids is prepared:

A-Preparation of polyester resins (a) Preparation of polyester resin No. 10

The following ingredients are used:

| | |
|---|---|
| adipic acid | 47.22% |
| "dimer acids" sold under the name of "PRIPOL 1022" by the company "UNICHEMA" and composed of 80% dimers and 20% trimers | 20.79% |
| monoethylene glycol | 14.97% |
| diethylene glycol | 17.00% |
| catalyst | 0.02% |

The acid number must be <2 and the hydroxyl value between 50 and 60. The polymerized fatty acids content of this polyester resin is 23.87% by weight.

(b) Preparation of polyester resin No. 11

The following ingredients are used:

| | |
|---|---|
| adipic acid | 54.14% |
| diethylene glycol | 45.84% |
| catalyst | 0.02% |

The acid number must be <2 and the hydroxyl value between 50 and 60.

B-Preparation of the hydroxy compound

The following ingredients are used:

| | |
|---|---|
| polyester resin No. 10 | 82.40% |
| monoethylene glycol | 11.30% |
| isobutyl phthalate | 5.00% |
| surfactant consisting of silicone oil sold under the name of "DOW CORNING DC 193" by "THE DOW CHEMICAL" company | 0.40% |
| 1,4-diazabicyclo[2.2.2.]octane | 0.55% |
| water | 0.35% |

C-Preparation of the prepolymer

The following ingredients are used:

| | |
|---|---|
| 4,4'-diphenylmethane diisocyanate with an NCO group content of 33.6 ± 0.2% by weight | 65.10% |
| polyester resin No. 11 | 34.90% |

The NCO group content must be 20.4±0.15% by weight.

D-Preparation of the elastomer

The procedure followed is that indicated in paragraph D in the general operating procedure with a hydroxy compound/prepolymer ratio of 50/50.

E-Measurement of mechanical properties before and after hydrolysis

The following results were obtained:

| | Before hydroylsis | After hydrolysis |
|---|---|---|
| Elongation at break (%) | 400 | 450 |
| Load at break (MPa) | 9.15 | 5.85 |

It is seen that the load at break is retained to an extent of 63.9% after hydrolysis, which is considered to be wholly satisfactory.

EXAMPLE 7

A urethane elastomer containing 12.0% of polymerized fatty acids is prepared.

A-Preparation of polyester resins

A polyester resin identical to polyester resin No. 2 as defined in the comparative example is used and polyester resin No. 12 is prepared with the following ingredients:

| | |
|---|---|
| adipic acid | 43.45% |
| phthalic anhydride | 4.84% |
| dimer acids sold under the name of "PRIPOL 1022" by the company "UNICHEMA" and composed of 80% dimers and 20% trimers | 19.30% |
| monoethylene glycol | 15.16% |
| diethylene glycol | 17.23% |
| catalyst | 0.02% |

The acid number must be <2 and the hydroxyl value between 50 and 60. The polymerized fatty acids content of this polyester resin is 21.91% by weight.

B-Preparation of the hydroxy compound

The following ingredients are used:

| | |
|---|---|
| polyester resin No. 12 | 89.57% |
| polyester resin No. 2 | 5.00% |
| monoethylene glycol | 4.40% |
| surfactant consisting of a mineral oil sold under the name of "PLASTIC OIL 263" by the "WITCO CHEMICAL" company | 0.30% |
| 1,2-diazabicyclo[2.2.2.]octane | 0.70% |
| water | 0.03% |

C-Preparation of the prepolymer

The same polymer as that prepared in Example 3 is used.

D-Preparation of the urethane elastomer

The procedure followed is that indicated in paragraph D of the general operating procedure with a hydroxy compound/prepolymer ratio of 61.3/38.7.

E-Measurement of mechanical properties before and after hydrolysis

The following results were obtained:

| | Before hydrolysis | After hydrolysis |
|---|---|---|
| Elongation at break (%) | 650 | 800 |
| Load at break (MPa) | 16.6 | 7.2 |

It is therefore seen that 43.4% of the load at break is retained after hydrolysis, but it remains greater than 5 MPa, resulting in the urethane elastomer prepared in this way being considered to have a reasonable hydrolysis resistance.

EXAMPLE 8

A urethane elastomer containing 10.5% of polymerized fatty acids is prepared.

A-Preparation of polyester resins

Polyester resin No. 2 as prepared in the comparative example as well as polyester resin No. 13, whose ingredients are given below, are used:

| | |
|---|---|
| adipic acid | 38.64% |
| phthalic anhydride | 9.65% |
| "dimer acids" sold under the name of PRIPOL 1022" by the company "UNICHEMA" and composed of 80% dimers and 20 trimers | 19.30% |
| monoethylene glycol | 15.17% |
| diethylene glycol | 17.22% |
| catalyst | 0.02% |

The acid number must be <2 and the hydroxyl value between 50 and 60. The polymerized fatty acids content of this polyester resin is 21.62% by weight.

B-Preparation of the hydroxyl compound

The following ingredients are used:

| | |
|---|---|
| polyester resin No. 13 | 79.65% |
| polyester resin No. 2 | 15.00% |
| monoethylene glycol | 4.40% |
| surfactant consisting of a mineral oil sold under the name of "PLASTIC OIL 263" by the "WITCO CHEMICAL" company | 0.40% |
| 1,4-diazabicyclo[2.2.2.]octane | 0.50% |
| water | 0.05% |

C-Preparation of the prepolymer

The same polymer as that prepared in Example 3 is used.

D-Preparation of the elastomer

The procedure followed is that indicated in paragraph D of the general operating procedure with a hydroxy compound/prepolymer ratio of 61/39.

E-Measurement of mechanical properties before and after hydrolysis

The following results were obtained:

| | Before hydrolysis | After hydrolysis |
|---|---|---|
| Elongation at break (%) | 575 | 850 |
| Load at break (MPa) | 11.7 | 5.4 |

It is seen that 46.2% of the load at break is retained after hydrolysis, this load, however, being greater than 5 MPa, which results in the urethane elastomer obtained in this way being considered satisfactory.

EXAMPLE 9

An elastomer containing 9.4% of polymerized fatty acids is prepared.

A-Preparation of polyester resins

Polyester resin No. 13 as defined in Example 8 and polyester resin No. 2 as defined in the comparative example are used.

B-Preparation of the hydroxy compound

The following ingredients are used:

| | |
|---|---|
| polyester resin No. 13 | 78.05% |
| polyester resin No. 2 | 14.70% |
| monoethylene glycol | 6.30% |
| surfactant consisting of a mineral oil sold under the name of "PLASTIC OIL 263" by "WITCO CHEMICAL" company | 0.40% |
| 1,4-diazabicyclo[2.2.2.]octane | 0.50% |
| water | 0.05% |

C-Preparation of the prepolymer

The same polymer as that defined in Example 3 is used.

D-Preparation of the urethane elastomer

The procedure followed is that indicated in paragraph D of the general operating procedure with a hydroxy compound/prepolymer ratio of 55.9/44.1

E-Measurement of mechanical properties before and after hydrolysis

The following results were obtained:

| | Before hydrolysis | After hydrolysis |
|---|---|---|
| Elongation at break (%) | 550 | 700 |
| Load at break (MPa) | 19.7 | 7.2 |

It is seen that 36.5% of the load at break is retained after hydrolysis, but this load, however, is greater than 5 MPa, which means that the urethane elastomer prepared in this manner can be considered satisfactory from the standpoint of its hydrolysis resistance.

EXAMPLE 10

An elastomer containing 7.9% of polymerized fatty acids is prepared.

A-Preparation of the polyester resin

Polyester resin No. 4, the formulation of which is given in Example 1, is used, this polyester containing 11.8% by weight of polymerized fatty acids.

B-Preparation of the hydroxy compound

A hydroxy compound is employed consisting solely of a chain-extending agent, namely 1,4-butanediol.

C-Preparation of the prepolymer

The following ingredients are employed:

| | |
|---|---|
| polyester resin No. 4 | 71.4% |
| 4,4'-diphenylmethane diisocyanate | 29.6% |

The NCO group content must be 6.6±0.15% by weight.

D-Preparation of the urethane elastomer

The procedure followed is that indicated in paragraph D of the general operating procedure with a hydroxy compound/prepolymer ratio of 6.5/93.5%

E-Measurement of mechanical properties before and after hydrolysis

The following results were obtained:

| | Before hydrolysis | After hydrolysis |
|---|---|---|
| Elongation at break (%) | 550 | 700 |
| Load at break (MPa) | 48 | 32 |

It is seen that the load at break is retained to an extent of 66.6% after hydrolysis, which is considered to be satisfactory.

We claim:

1. Method for improving the hydrolysis resistance of a substantially saturated urethane elastomer, the said elastomer being prepared by reacting a hydroxy compound with a prepolymer, the weight ratio hydroxy compound/prepolymer being between 5/95 and 95/5, the said hydroxy compound consisting:

either of at least one chain-extending agent;

or of at least one saturated polyester resin in the presence of the usual additives;

or of a mixture of at least one chain-extending agent and at least one saturated polyester resin in the presence of the usual additives;

each chain-extending agent and each saturated polyester resin containing at least two hydroxy end groups, the said prepolymer being prepared by reacting at least one saturated polyester resin containing at least two hydroxy end groups and at least one organic isocyanate of functionality of at least 2, the isocyanate(s) being in molar excess relative to the saturated polyester resin(s), each of the polyester resins being prepared by reacting at least one saturated polyacid with at least one saturated polyol, in which method, to prepare at least one of the saturated polyester resins, a fraction of the saturated polyacid(s) is replaced by at least one polymerized fatty acid consisting essentially of a dimer and/or a trimer, the initial total content of polymerized fatty acid(s) being between 1 and 35% by weight, these percentages being referred to the said substantially urethane elastomer.

2. Method according to claim 1, wherein an initial content of polymerized fatty acid(s) is chosen between 4 and 25% by weight, these percentages being referred to the finished product.

3. Method according to claim 1, wherein a polymerized fatty acid is used consisting essentially of a dimer and a trimer and containing from 4 to 25% by weight of trimer.

4. Method according to claim 3, wherein a polymerized fatty acid containing about 80% by weight of dimer and about 20% by weight of trimer is used.

5. Method according to claim 1, wherein the polymerized fatty acids are chosen from the group consisting of the dimers and trimers of unsaturated aliphatic monoacids containing from 8 to 24 carbon atoms, and mixtures of these with one another.

6. Method according to claim 5, wherein the polymerized fatty acids are introduced in the form of dimer and trimer fatty acids which are obtained by fractionating polymerized fatty acids or mixtures of polymerized fatty acids and which contain less than about 1.5% by weight of monomers.

7. Method according to claim 6, wherein the polymerized fatty acids are introduced in the form of a polymeric composition derived from a mixture of unsaturated fatty acids containing, on average, 18 carbon atoms and including:

from 0 to 1.5% by weight of monomers;

from 80 to 96% by weight of dimers; and
from 4 to 20% by weight of trimers.

8. Method according to claim 1, wherein a hydroxy compound/prepolymer weight ratio of the order of 60/40 is chosen.

9. Method according to claim 1, wherein polyester resins whose acid number is less than 2 and whose hydroxyl value is between about 25 and 230 are used.

10. Method according to claim 1, wherein a prepolymer whose isocyanate group content is between 2 and 25% by weight is used.

11. A composition consisting of
   (a) a hydroxy compound consisting of (i) at least one-chain-extending agent, (ii) at least one saturated polyester resin in the presence of usual additives or (iii) a mixture of (i) and (ii),
   each said chain-extending agent and each said saturated polyester resin containing at least two hydroxy end groups; and
   (b) a prepolymer formulated from at least one of the said polyester resins and at least one organic isocyanate of functionality of at least 2, the isocyanate(s) being in molar excess relative to the said polyester resin(s),
   the said hydroxy compound and the said prepolymer constituting the ingredients of the formulation of the desired urethane elastomer, said ingredients being used in a weight ratio between 5/95 and 95/5, wherein at least one of said polyester resins includes in its formulation at least one polymerized fatty acid consisting substantially of a dimer and/or a trimer, the initial total content of polymerized fatty acid(s) being between 1 and 35 weight percent based on the weight of said substantially saturated urethane elastomer.

12. The composition according to claim 11, wherein the polymerized fatty acid consists substantially of a dimer and a trimer and contains 4 to 25% by weight of trimer.

13. The composition according to claim 12, wherein the polymerized fatty acid contains about 80% by weight of dimer and about 20% by weight of trimer.

14. The composition of claim 11, wherein the polymerized fatty acids are chosen from the group consisting of the dimers and trimers of unsaturated aliphatic monoacids containing from 8 to 24 carbon atoms, and mixtures of these with one another.

15. The composition according to claim 14, wherein the polymerized fatty acids are present in the formulation of the polyester(s) in the form of dimer and trimer fatty acids which are obtained by fractionating polymerized fatty acids or mixtures of polymerized fatty acids and which contain, by weight, less than about 1.5% of monomers.

16. The composition according to claim 15, wherein the polymerized fatty acids are present in the formulation of the polyester(s) in the form of a polymeric composition which is derived from a mixture of unsaturated fatty acids containing, on average, 18 carbon atoms and including:
   from 0 to 1.5% by weight of monomers;
   from 80 to 96% by weight of dimers; and
   from 4 to 20% by weight of trimers.

17. Urethane elastomer with improved hydrolysis resistance obtained by the method as defined in claim 1.

18. The composition of claim 11 wherein the initial content of the polymerized fatty acid(s) in said polyester resin is between 4 and 25 weight percent based on the weight of said substantially saturated urethane elastomer.

19. The method of claim 1 wherein said chain-extending agent is a low molecular weight polyol, an aromatic amine or an aliphatic polyamine.

20. The method fo claim 19 wherein said chain-extending agent is monoethylene glycol, 1,4-butanediol, trimethylolpropane, glycerol, methylenebis(2-chloroaniline), methylenebis(dipropylaniline), diethyltoluenediamine, trimethylene glycol di-p-aminobenzoate or isophorone diamine.

* * * * *